United States Patent [19]
Greene et al.

[11] 3,762,308
[45] Oct. 2, 1973

[54] POTATO PEELER

[76] Inventors: David H. Greene; Elizabeth L. Greene, both of 45 Shornecliffe Rd., Newton; Robert J. Madzar, 24 Grove St., Natick, all of Mass.

[22] Filed: Sept. 30, 1971

[21] Appl. No.: 185,170

[52] U.S. Cl. .................................................. 99/632
[51] Int. Cl. ............................................... A23n 7/02
[58] Field of Search ..................... 146/49 B, 50 A; 99/629, 630, 632

[56] References Cited
UNITED STATES PATENTS 3,266,540 8/1966 Bradham ........................ 146/49 B
2,813,376 11/1957 Middlemark ..................... 146/49 B
1,886,061 11/1932 Speidel ........................... 146/50 A

*Primary Examiner*—Willie G. Abercrombie
*Attorney*—Wolf, Greenfield & Sacks

[57] ABSTRACT

A potato peeler having a base containing a motor and a container having a rotating abrading disc driven by the motor. A deflector extends above the disc from the side of the container and has an abrading surface. The abrading surface of the disc and deflector are defined by pyramidal teeth.

This invention relates to potato peelers and more particularly comprises an electrically driven potato peeler designed for home use.

4 Claims, 3 Drawing Figures

PATENTED OCT 21 1973 3,762,308

POTATO PEELER

BACKGROUND OF THE INVENTION

A number of different potato peelers intended for the home market have been made in the past, but all had certain disadvantages which limited their commercial acceptance. For example, certain of the prior art devices produced a potato loss of approximately 10 percent or more. Others worked very slowly. Still others were difficult to clean after use, and certain of the prior art devices were too costly.

The potato peeler of the present invention is inexpensive to manufacture, has a minimum number of moving parts, works very rapidly in peeling the potatoes, is easy to clean, and produces a negligible potato loss of approximately 2 percent.

The potato peeler of this invention includes among its features a flat rotating disc which in its preferred form has formed as an integral part thereof an abrasive surface composed of four-sided pyramids. The rotating disc cooperates with a deflector on the side of the container having an abrasive surface very similar in configuration to that of the disc, to skin potatoes placed in the container.

BRIEF FIGURE DESCRIPTION

DETAILED DESCRIPTION

Figure 1:
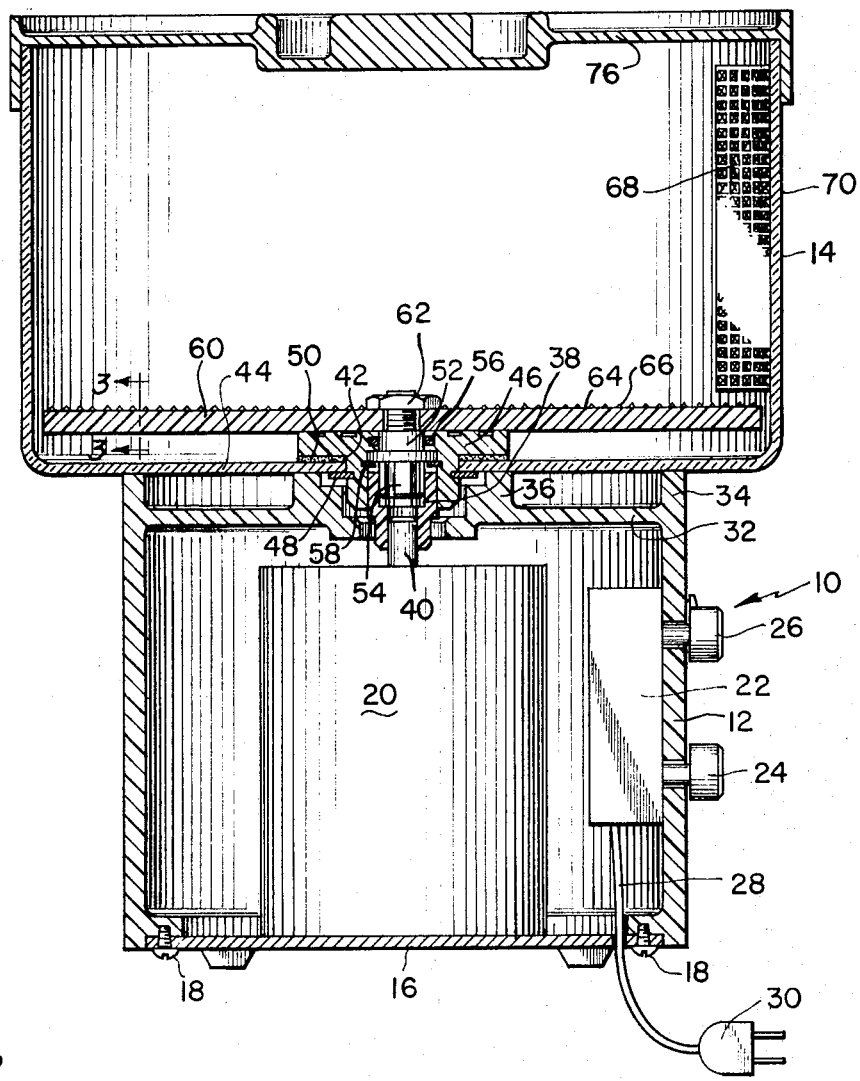
FIG. 1 is a cross sectional view of a potato peeler constructed in accordance with this invention.

The potato peeler shown in the drawings includes a base 10 in the form of a cylindrical housing 12 and a container 14 removably supported on the housing. Typically the housing 12 may be molded of plastic while the container 14 may be glass, plastic, or some other suitable material which can easily be washed.

The housing 12 has a removable bottom wall 16 secured in place by screws 18 and contains motor 20 connected to control box 22 having a conventional speed control 24 and timer 26. The motor is energized through line cord 28 which extends out of the housing and carries plug 30.

The housing 12 has formed as an integral part thereof a cover wall 32 surrounded by upstanding marginal flange 34 at its periphery, which serves as a support for the container 14. A second circular flange 36 is formed as an integral part of the cover wall 32 and surrounds octal socket 38 connected to the motor shaft 40. When the motor 20 is energized through the control box 22, its shaft 40 rotates and octal socket 38 rotates with it.

The structure described above (with the exception of container 14) forms the base 10 and may be considered a unitary structure. Container 14 and its associated parts are separate from the base and may readily be removed by lifting the container off the housing 12.

Container 14 has an opening 42 in its bottom wall 44, which receives a thrust bearing 46 held in place in the opening 42 by snap ring 48. The thrust bearing is sealed against the bottom wall 44 of the container by gasket 50 made of a suitable material in order to prevent any leakage of the container contents through opening 42. Thrust bearing 46 in turn supports a shaft 52 which is square in cross section at its lower end 54 and fits into octal socket 38 to couple shaft 52 to motor shaft 40 so that the two rotate together. The shaft 52 is surrounded by an O-ring 56 imbedded in the thrust bearing 46, and snap ring 58 retains shaft 52 in place in bearing 46. Abrading disc 60 is seated on the upper end of shaft 52 and is retained in place by nut 62. Nut 62 threaded on to the top of shaft 52 enables disc 60 to be conveniently removed from the shaft for cleaning or other purposes. The upper surface 64 of the disc 60 is covered by four-sided pyramids 66 which abrade the skin of potatoes which are placed in container 14.

Figure 2:
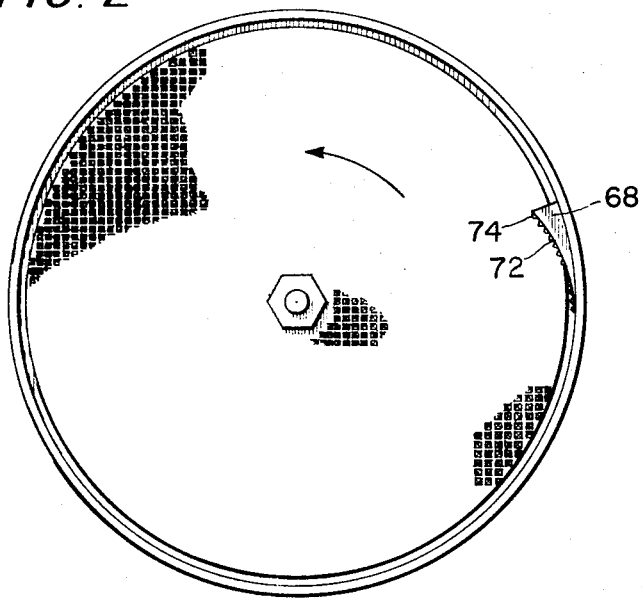
FIG. 2 is a top view of the peeler shown in FIG. 1 with the cover removed.
Figure 3:
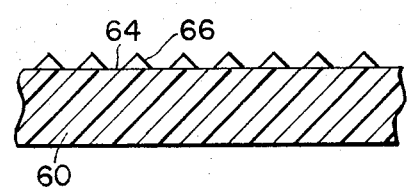
FIG. 3 is an enlarged fragmentary cross sectional view taken on the section line 3—3 of FIG. 1.

A second abrading member 68 is carried on cylindrical side wall 70 of container 14 and serves as a deflector in cooperation with disc 60. As viewed in FIG. 2, the deflector 68 has a curved working surface 72 perpendicular to and overlying the edge of disc 60 and which is covered by four-sided pyramids 74 identical to the pyramids 66 on disc surface 64.

In the preferred form, the deflector 68 with its pyramidal teeth 74 and the disc 60 with its pyramidal teeth 66 are each formed as unitary structures, preferably molded of Delrin or other suitable plastic having the stiffness and durability required to enable the teeth to abrade the potato surface so as to remove the skin. By making the teeth of four-sided pyramids, the molds in which the disc and deflector are formed may be conveniently machined.

In use, motor 20 may typically rotate at 400 rpm, and container 14 may be sized to hold approximately 3 lbs. of potatoes with its cover 76 in place. The motor may be turned on by the speed control 24 (which may provide variable speed for the motor when the device is designed for a variety of uses, and the timer 26 may be preset for a prescribed duration. Tests have revealed that approximately 1 minute per pound of potatoes is required for complete peeling.

In operation, the potatoes are placed in container 14, and the container is filled to the level of the disc 60 with water. Then the cover is closed, and the machine is turned on. The potatoes which are supported on the disc 60 are abraded by the pyramidal teeth 66 on the disc, and simultaneously the potatoes are thrown outwardly, under the influence of centrifugal force, against cylindrical wall 70 of the container. At the cylindrical wall the potatoes are brought into contact with deflector 68 where deflector teeth 74 also work on the potato surface to remove the skin. After the prescribed operating time, the cover 76 is removed, the water poured off, and the potatoes may be washed to remove any of the loose peelings which may adhere to them. Tests have demonstrated that with this particular device a loss of approximately 2 percent is experienced, which is a minor fraction of the loss experienced by other known peelers. To wash the container after use, the entire container assembly including the thrust bearing 46 and shaft 52 are removed from base 10, and they may be immersed in water. Further, disc 60 itself may be detached merely by unscrewing nut 62 which retains the disc in place on the upper end of shaft 52. After washing, the entire assembly may be again reassembled as shown in FIG. 1.

Those skilled in the art will appreciate that numerous modifications may be made of this invention without departing from its spirit. Therefore it is not intended that the scope of the invention be limited to the specific embodiment illustrated and described, but rather the

What is claimed is:

1. A potato peeler comprising
a base containing a motor and shaft,
a container having side and bottom walls and removably carried by the base and carrying a horizontally oriented rotatable disc,
a coupling for connecting the motor shaft to the disc for imparting rotation to it,
and a deflector mounted along the side wall of the container and in the path of objects thrown by centrifugal force outwardly from the disc when the disc is rotated,
said disc and deflector having abrading surfaces made up of pyramid-like teeth projecting from the surface.

2. A potato peeler as defined in claim 1 further characterized by
said disc and deflector being made of a molded plastic material with the teeth molded as an integral part thereof, said disc and deflector being free of opening and crevices which may trap particles of peel.

3. A potato peeler as described in claim 2 further characterized by
said deflector having a curved surface which extends over and is perpendicular to the top of the disc.

4. A potato peeler as described in claim 3 further characterized by
said motor shaft being vertically oriented and carrying an octal socket at its upper end,
said disc being carried by a shaft having a bottom which removably fits into the socket.

* * * * *